(12) United States Patent
Chu et al.

(10) Patent No.: US 11,874,526 B2
(45) Date of Patent: Jan. 16, 2024

(54) TEXTILE DETECTION MODULE, TEXTILE SORTING SYSTEM AND USING METHOD THEREOF

(71) Applicant: Industrial Technology Research Institute, Hsinchu (TW)

(72) Inventors: Jen-You Chu, Hsinchu (TW); Ruei-Han Jiang, Taipei (TW); Yi-Cyun Yang, Changhua County (TW); Kuan-Yeh Huang, Hsinchu County (TW); Ssu-Yu Huang, Hsinchu County (TW); Kai-Jen Hsiao, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 318 days.

(21) Appl. No.: 17/516,703

(22) Filed: Nov. 2, 2021

(65) Prior Publication Data
US 2022/0137330 A1    May 5, 2022

Related U.S. Application Data

(60) Provisional application No. 63/108,857, filed on Nov. 2, 2020.

(51) Int. Cl.
*G01B 11/02* (2006.01)
*G01B 11/22* (2006.01)
(Continued)

(52) U.S. Cl.
CPC ............ *G02B 7/40* (2013.01); *B65G 47/46* (2013.01); *G01B 11/02* (2013.01); *G01J 3/108* (2013.01); *G01J 3/44* (2013.01); *G02B 7/09* (2013.01)

(58) Field of Classification Search
CPC . G02B 7/40; G02B 7/09; G01N 33/36; B65G 47/46; G01B 11/02; G01B 11/22; G01J 3/44; G01J 3/108
(Continued)

(56) References Cited

U.S. PATENT DOCUMENTS 5,315,666 A * 5/1994 Norton-Wayne .... G01B 11/024
                                                          382/286
5,805,291 A * 9/1998 Calvin ............... G01B 11/0691
                                                          356/429

(Continued)

FOREIGN PATENT DOCUMENTS

CN        104316506        5/2017
CN        206255721        6/2017
(Continued)

OTHER PUBLICATIONS

US 2023/0264901 A1, Mahringer, Aug. 24 (Year: 2023).*
(Continued)

*Primary Examiner* — Douglas A Hess
(74) *Attorney, Agent, or Firm* — JCIPRNET

(57) ABSTRACT

A textile detection module is suitable for detecting a test specimen. The textile detection module includes a height sensor, an excitation light source, an optical detector, and a focuser. The height sensor is suitable for measuring a height of the test specimen to generate a height signal. The excitation light source provides an excitation light beam. The optical detector is disposed on a transmission path of the excitation light beam and is suitable for receiving the excitation light beam and emitting the excitation light beam along the optical axis and receiving a detection light beam to generate a detection result. The focuser is disposed on the transmission path of the excitation light beam emitted by the optical detector. The focuser includes a focus lens suitable (Continued)

for converting the excitation light beam into a focused excitation light beam.

14 Claims, 6 Drawing Sheets

(51) Int. Cl.
*G01N 33/36* (2006.01)
*G01J 3/44* (2006.01)
*G02B 7/40* (2021.01)
*B65G 47/46* (2006.01)
*G01J 3/10* (2006.01)
*G02B 7/09* (2021.01)

(58) Field of Classification Search
USPC .......................................................... 198/358
See application file for complete search history.

(56) References Cited

U.S. PATENT DOCUMENTS

| | | | | |
|---|---|---|---|---|
| 6,348,696 | B1 * | 2/2002 | Alt | G01B 11/028 |
| | | | | 250/559.12 |
| 6,728,593 | B2 * | 4/2004 | Hu | G06T 7/0004 |
| | | | | 356/613 |
| 6,882,423 | B2 * | 4/2005 | Rust | G01N 33/362 |
| | | | | 356/429 |
| 7,236,625 | B2 * | 6/2007 | Engelbart | B29C 70/54 |
| | | | | 250/306 |
| 8,373,856 | B2 | 2/2013 | Carron et al. | |
| 10,408,675 | B2 * | 9/2019 | Marquardt | G01J 3/0262 |
| 10,783,624 | B2 * | 9/2020 | Weiss | H04N 23/56 |
| 11,619,579 | B2 * | 4/2023 | Kawaguchi | B07C 5/3427 |
| | | | | 250/339.11 |
| 2012/0044487 | A1 | 2/2012 | Carron et al. | |
| 2016/0091366 | A1 | 3/2016 | Yang et al. | |

FOREIGN PATENT DOCUMENTS

| | | |
|---|---|---|
| CN | 105890753 | 12/2017 |
| CN | 107671002 | 2/2018 |
| CN | 107884388 | 4/2018 |
| GB | 2300480 | 11/1996 |
| TW | 201418544 | 5/2014 |
| WO | 02057030 | 7/2002 |

OTHER PUBLICATIONS

"Office Action of Taiwan Counterpart Application", dated Jul. 4, 2022, p. 1-p. 3.
"Search Report of Europe Counterpart Application", dated Mar. 14, 2022, p. 1-p. 6.

* cited by examiner

TEXTILE DETECTION MODULE, TEXTILE SORTING SYSTEM AND USING METHOD THEREOF

CROSS-REFERENCE TO RELATED APPLICATION

This application claims the priority benefit of U.S. Provisional Application No. 63/108,857, filed on Nov. 2, 2020. The entirety of the above-mentioned patent application is hereby incorporated by reference herein and made a part of this specification.

BACKGROUND

Technical Field

The disclosure relates to a detection module, a sorting system and a using method thereof, and particularly relates to a textile detection module, a textile sorting system and a using method thereof.

Description of Related Art

The global textile consumption is growing rapidly. In 2015, the global fiber consumption was about 96 million tons, which will increase to 257 million tons in 2050. The European Union requires member states to start special textile recycling from 2025. However, there are too many types of fiber materials used in textiles. Blended fibers are often adopted for different functional purposes, and the fabrics have many colors and patterns, which greatly increases the difficulty of fabric recycling and classification.

For spectral sorters currently on the market, charge-coupled device (CCD) sorter, near infrared (NIR) sorter (such as Brisort Co.), and visible light Raman sorter (such as Recycle Time Co., Ltd.) are common separators used in PET recycling. However, there are too many types of fiber materials used in textiles, and blended fibers are often adopted for different functional purposes, which increases the difficulty of fabric recycling.

SUMMARY

The disclosure provides a textile detection module, a textile sorting system and a using method thereof, which can greatly improve the efficiency and accuracy of optical detection of a test specimen, thereby improving the sorting efficiency of the test specimen.

The disclosure provides a textile detection module suitable for detecting a test specimen. The textile detection module includes a height sensor, an excitation light source, an optical detector, and a focuser. The height sensor is suitable for measuring a height of the test specimen to generate a height signal. The excitation light source provides an excitation light beam. The optical detector is disposed on a transmission path of the excitation light beam and is suitable for receiving the excitation light beam and emitting the excitation light beam along an optical axis and receiving a detection light beam to generate a detection result. The focuser is disposed on the transmission path of the excitation light beam emitted by the optical detector. The focuser includes a focus lens, which is suitable for converting the excitation light beam into a focused excitation light beam. The focused excitation light beam is transmitted from the focuser to the test specimen to generate the detection light beam. The focuser adjusts a position of the focus lens according to the height signal. The height sensor measures the height of the test specimen at a first position of a conveying path, the optical detector performs optical detection on the test specimen at a second position of the conveying path, and the test specimen moves from the first position to the second position along the conveying path.

The disclosure also provides a textile sorting system, which includes a conveying device, a textile detection module, and at least one sorting module. The conveying device is suitable for moving a test specimen along a conveying path. The textile detection module is the above-mentioned textile detection module, which is disposed at the conveying device. The at least one sorting module is disposed at the conveying device. An optical detector is located between a height sensor and the at least one sorting module. The at least one sorting module sorts the test specimen according to a detection result.

The disclosure also provides a using method of a textile sorting system, which includes the following steps. A test specimen is provided to a conveying device to move along a conveying path. A height of the test specimen is measured to generate a height signal. A focuser is adjusted according to the height signal. A focused excitation light beam is provided to the test specimen to generate a detection light beam. The detection light beam is received to generate a detection result. The test specimen is sorted according to the detection result. The height of the test specimen is measured at a first position of the conveying path, optical detection is performed when the test specimen is at a second position of the conveying path, and the test specimen moves from the first position to the second position along the conveying path.

In order for the features and advantages of the disclosure to be more obvious and understandable, specific embodiments are described in detail below in conjunction with the accompanying drawings.

DETAILED DESCRIPTION OF DISCLOSED EMBODIMENTS

Figure 1:
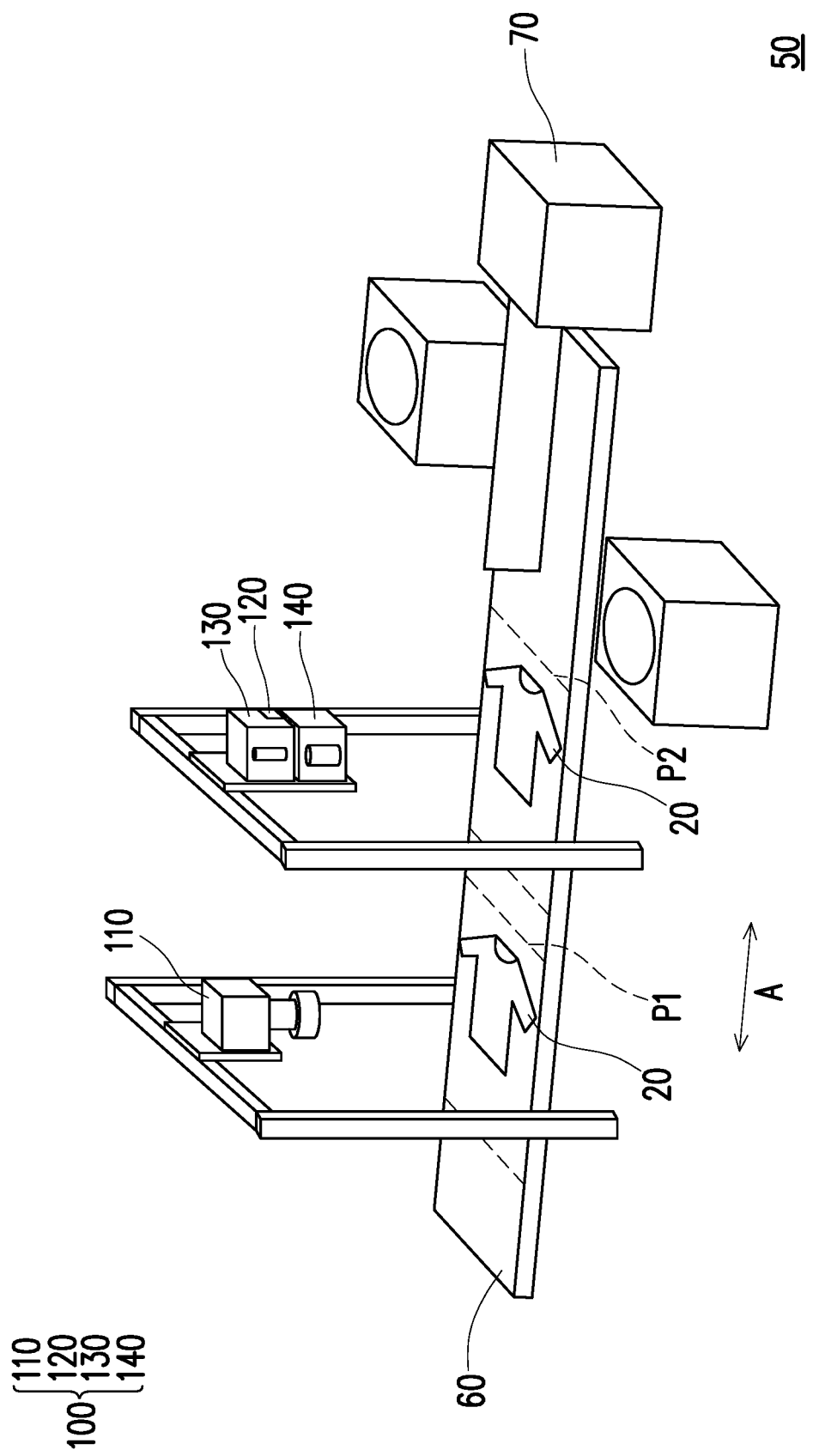
FIG. 1 is a schematic view of a textile sorting system according to an embodiment of the disclosure.

FIG. 1 is a schematic view of a textile sorting system according to an embodiment of the disclosure. Please refer to FIG. 1. The embodiment provides a textile sorting system 50, which is suitable for sorting a test specimen 20. The textile sorting system 50 includes a conveying device 60, a textile detection module 100, and at least one sorting module 70. The textile sorting system 50 is suitable for analyzing and classifying the test specimen 20 to facilitate the recycling and reuse of textiles. The test specimen 20 is, for example, a mixed-material textile, such as clothing, cloth, and a cloth object.

The conveying device 60 is, for example, an equipment including a conveyor belt, which is suitable for uninterruptedly and continuously conveying the test specimen 20 along a conveying path A. In detail, each station device of the conveying device 60 is configured with multiple position detectors, which are suitable for detecting the test specimen 20 to feedback a specific position of the test specimen 20, so that each station device may work on the test specimen 20. The disclosure does not limit the number and type of the position detectors.

The textile detection module 100 is disposed at the conveying device 60 and is suitable for detecting the material composition of the test specimen 20 to generate a detection result to facilitate sorting by the sorting module 70. The textile detection module 100 includes a height sensor 110, an excitation light source 120, an optical detector 130, and a focuser 140.

The sorting module 70 is disposed at the conveying device 60, and the optical detector 130 is located between the height sensor 110 and the sorting module 70. For example, the sorting module 70, for example, includes a divider board, which may also be a device capable of sorting, such as an air blowing device or a mechanical arm, and the disclosure is not limited thereto. The sorting module 70 sorts the test specimen 20 according to the detection result of the textile detection module 100.

Figure 2:
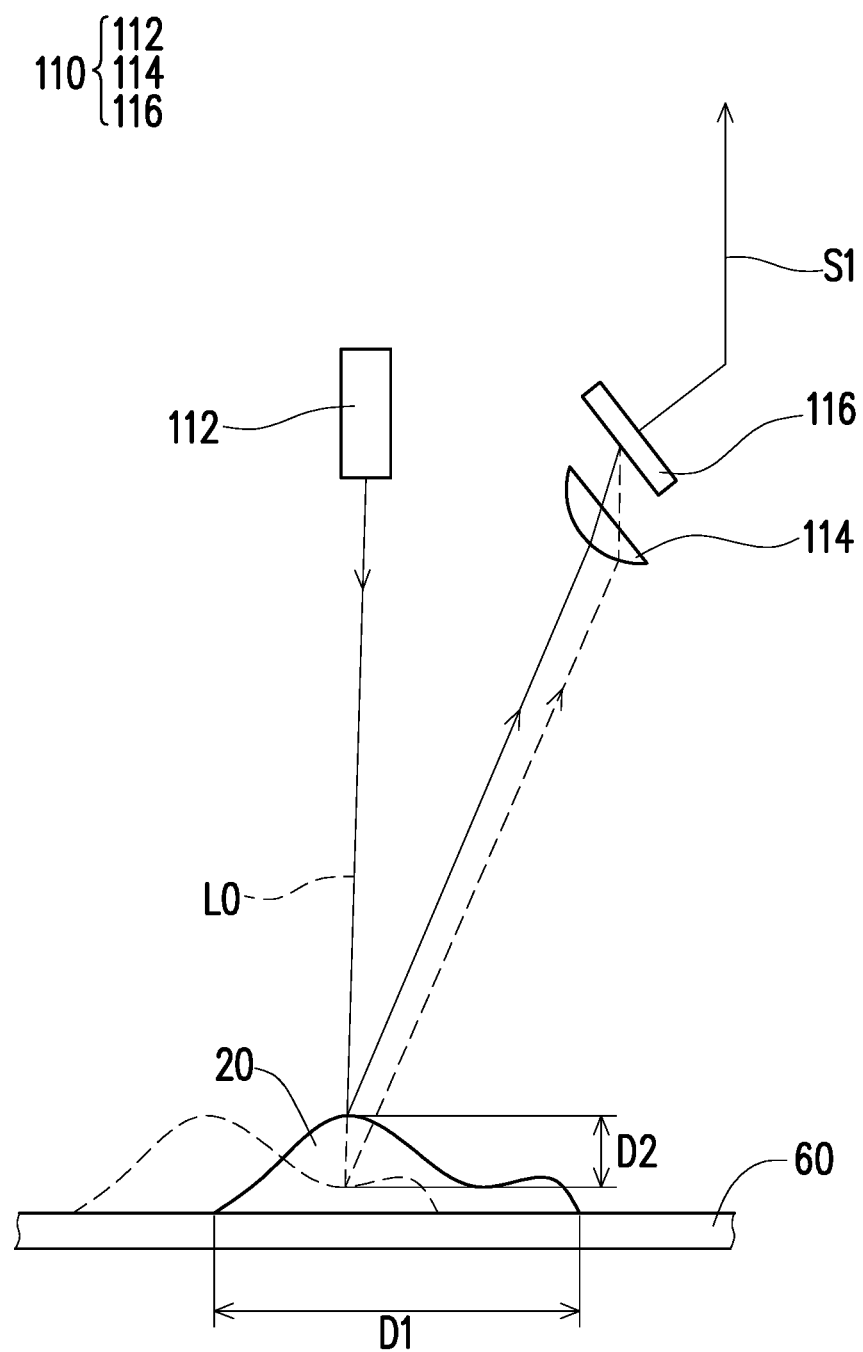
FIG. 2 is a schematic side view of a height sensor of the textile sorting system of FIG. 1.

FIG. 2 is a schematic side view of a height sensor of the textile sorting system of FIG. 1. Please refer to FIG. 1 and FIG. 2. The height sensor 110 is suitable for measuring the height of the test specimen 20 to generate a height signal S1. For example, the height sensor 110 includes a laser light source 112, a condenser 114, and a receiving element 116. The laser light source 112 is, for example, a laser light source with a wavelength of 655 nanometers, which provides a measuring light beam L0 to the test specimen 20. The measuring light beam L0 is reflected back after being incident on the test specimen 20 and is received by the receiving element 116. The condenser 114 is disposed on a transmission path of the measuring light beam L0 reflected by the test specimen 20 to converge the measuring light beam L0. The receiving element 116 is suitable for receiving the measuring light beam L0 to generate the height signal S1 with height information of the test specimen 20.

In the embodiment, the height sensor 110 measures the height of the test specimen 20 at a first position P1 of the conveying path A. In addition, in the embodiment, the time required to measure the height of a single test specimen 20 is about 10 milliseconds. Compared with the slower moving speed of the conveyor belt of the conveying device 60, when the height sensor 110 measures the height of the test specimen 20, the conveying device 60 does not need to stop moving the test specimen 20. In other words, during the measurement process, the conveying device 60 may continuously and uninterruptedly transport the test specimen 20. Therefore, the efficiency of subsequent detection of the test specimen 20 can be improved. Furthermore, since the conveying device 60 does not stop moving the test specimen 20, when the height sensor 110 measures the height, continuous height information change situation is measured according to the height fluctuation change of the test specimen 20 at the corresponding horizontal position of the conveying device 60 to generate the height signal S1 for the subsequent focuser 140 to adjust a focus position (to be described in detail later) according to the height signal S1.

In an embodiment, when the height sensor 110 measures the height of the test specimen 20, a single point measurement is adopted to adjust the focus. In detail, the height sensor 110 performs a single height measurement on a single test specimen 20, that is, in a maximum length D1 of the test specimen 20 at the horizontal position, a position of a single point is taken to generate the height signal S1, so that the subsequent focuser 140 may adjust the focus position according to the height signal S1, that is, in the embodiment, the focuser 140 performs a single focus adjustment for the height of the test specimen 20.

However, in another embodiment, when the height sensor 110 measures the height of the test specimen 20, a multi-point measurement is adopted to adjust the focus. In detail, the height sensor 110 performs multiple height measurements on a single test specimen 20, that is, in the maximum length D1 of the test specimen 20 at the horizontal position, positions of multiple points are taken to generate multiple height signals S1, so that the subsequent focuser 140 may adjust the focus position according to the height signals S1, that is, in the embodiment, the focuser 140 performs multiple focus adjustments for the test specimen 20 along with the movement of the conveying device 60.

Figure 3:
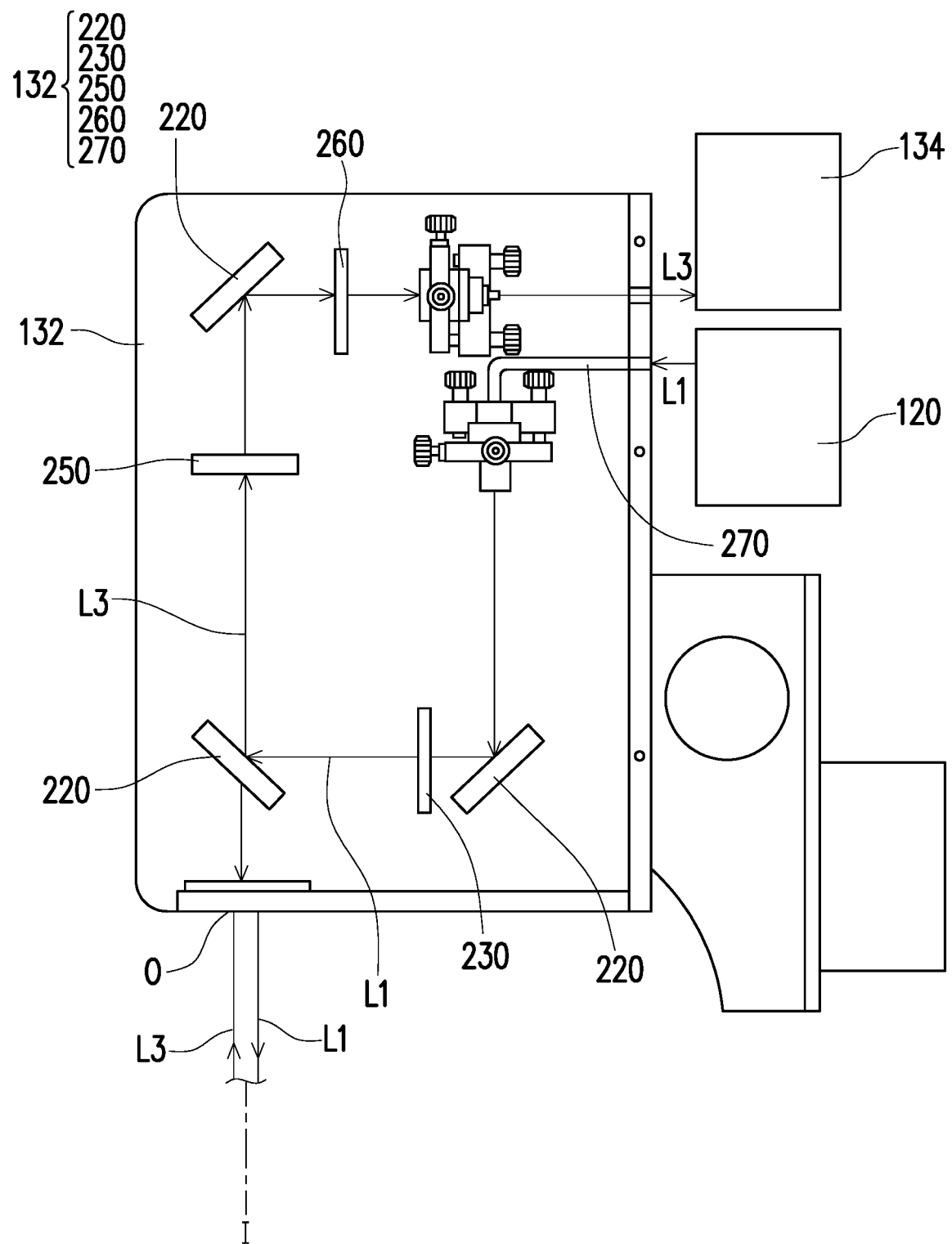
FIG. 3 is a schematic side view of an excitation light source and an optical detector of the textile sorting system of FIG. 1.

FIG. 3 is a schematic side view of an excitation light source and an optical detector of the textile sorting system of FIG. 1. Please refer to FIG. 1 and FIG. 3. The excitation light source 120 provides an excitation light beam L1 to the optical detector 130. In the embodiment, the excitation light source 120 is an infrared laser light emitting device, and the wavelength of the excitation light beam L1 is greater than 900 nanometers. In an embodiment, the wavelength of the excitation light beam L1 is 1064 nanometers.

The optical detector 130 is disposed on a transmission path of the excitation light beam L1 and is suitable for receiving the excitation light beam L1 provided by the excitation light source 120 and emitting the excitation light beam L1 along an optical axis I. In addition, the optical detector 130 receives a detection light beam L3 with a Raman signal to generate the detection result. Specifically, the optical detector 130 includes a Raman optical instrument 132 and an infrared spectrometer 134. The Raman optical instrument 132 is suitable for receiving the excitation light beam L1 and emitting the excitation light beam L1 to the focuser 140. The infrared spectrometer 134 receives the detection light beam L3 with the Raman signal of the test specimen 20 from the Raman optical instrument 132, and generates the detection result according to the Raman signal of the detection light beam L3.

Furthermore, the Raman optical instrument 132 includes multiple optical elements, such as a dichroic filter 220, a line filter 230, a notch filter 250, and/or an aperture 260. By combining and matching the above-mentioned optical elements, the excitation light beam L1 with a wavelength of 1064 nanometers may be guided to an opening end 0 to be emitted along the optical axis I, and the detection light beam L3 with the Raman signal may be received along the optical axis I to be transmitted to the infrared spectrometer 134. In addition, the Raman optical instrument 132 may further include an optical guiding element 270, such as an optical fiber, which is suitable for receiving and transmitting the excitation light beam L1, thereby improving the usage efficiency of the excitation light source 120.

Figure 4:
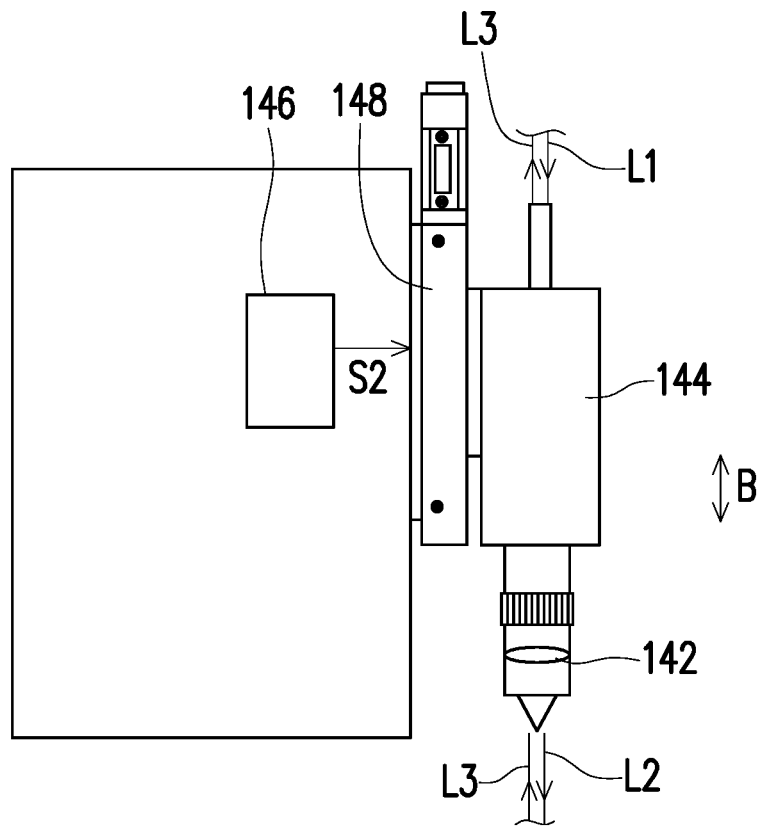
FIG. 4 is a schematic side view of a focuser of the textile sorting system of FIG. 1.

FIG. 4 is a schematic side view of a focuser of the textile sorting system of FIG. 1. Please refer to FIG. 1, FIG. 3, and FIG. 4. The focuser 140 is disposed on the transmission path of the excitation light beam L1 emitted by the optical detector 130. Specifically, the focuser 140 includes a focus lens 142, which is suitable for focusing and converting the excitation light beam L1 into a focused excitation light beam L2. The focused excitation light beam L2 is transmitted from the focuser 140 to the test specimen 20 to generate the detection light beam L3 with the Raman signal. The focuser 140 adjusts the position of the focus lens 142 according to the height signal S1.

Specifically, in the embodiment, the focuser 140 further includes a carrier 144, a control element 146, and a driving element 148. The carrier 144 carries the focus lens 142. The control element 146 receives the height signal S1 generated by the height sensor 110 measuring the height of the test specimen 20, and generates an adjustment signal S2 according to the height signal S1, thereby providing the adjustment signal S2 to the driving element 148. The driving element 148 moves the position of the carrier 144 along an adjustment path B according to the adjustment signal S2, thereby moving the focus lens 142 to adjust the focus effect of the excitation light beam L1 on the test specimen 20. An extension direction of the adjustment path B is parallel to an extension direction of the optical axis I (as shown in FIG. 3).

In the embodiment, the optical detector 130 performs optical detection on the test specimen 20 at a second position P2 of the conveying path A, and the test specimen 20 moves from the first position P1 to the second position P2 along the conveying path A. Since the height of the test specimen 20 at the first position P1 has been measured through the height sensor 110, when the test specimen 20 moves to the second position P2, the focus lens 142 has been adjusted to an appropriate focus position according to the height signal S1. Therefore, when the optical detector 130 performs optical detection on the test specimen 20, the conveying device 60 also does not need to stop moving the test specimen 20. In other words, during the optical detection process, the conveying device 60 may continuously and uninterruptedly transport the test specimen 20. In this way, the efficiency and accuracy of optical detection of the test specimen 20 can be greatly improved, thereby improving the sorting efficiency of the test specimen 20.

It is worth mentioning that in different embodiments, the moving speed of the focus lens 142 has a relatively great tolerance for the height fluctuation (that is, a maximum height difference D2 shown in FIG. 2) of the test specimen 20. For example, if the moving speed of the focus lens 142 reaches 120 millimeters per second, and the moving position accuracy may be less than or equal to 200 microns, the speed of the conveyor belt of the conveying device 60 may be greater than 5 centimeters per second and less than 100 centimeters per second. The relative relationship may be expressed as:

$$\Delta d/V_L < L/V_C$$

wherein, $\Delta d$ is the maximum height difference D2 (as shown in FIG. 2) of the test specimen 20;

$V_L$ is the moving speed of the focus lens 142;

L is the maximum length D1 (as shown in FIG. 1) of the test specimen 20; and $V_C$ is the speed of the conveyor belt of the conveying device 60 (that is, the moving speed of the test specimen 20).

Alternatively, the relative relationship may also be expressed as: $\Delta d/L < V_L/V_C$, wherein $\Delta d/L$ may be referred to as the unevenness per unit length of the test specimen 20. In other words, a ratio of the maximum height difference D2 of the test specimen 20 to the moving speed of the focus lens 142 is less than a ratio of the maximum length D1 of the test specimen 20 to the moving speed of the test specimen 20. Therefore, by adjusting a ratio of the moving speed of the focus lens 142 to the speed of the conveying device 60, the test specimens 20 with different sizes can be further detected and sorted to achieve good efficiency, but the disclosure is not limited thereto.

In addition, in an embodiment, the focuser 140 and the optical detector 130 do not have a linkage relationship. Therefore, when the focuser adjusts the position according to the height signal S1, the optical detector 130 does not move along with the focuser. Therefore, the speed of focus adjustment can be improved to achieve the function of fast-moving panning.

Figure 5:
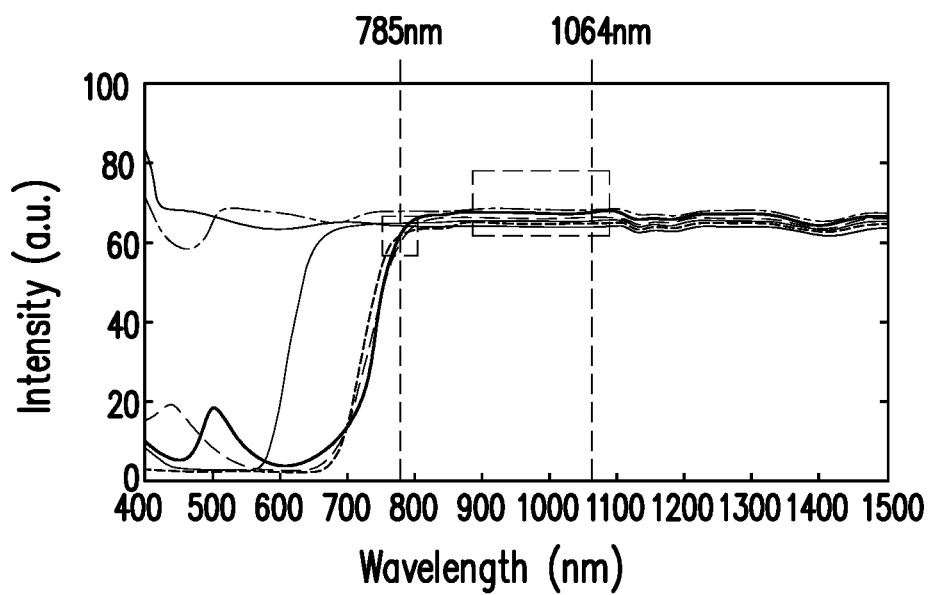
FIG. 5 is a graph of light absorption intensity versus Raman signals excited by light with different wavelengths.

FIG. 5 is a graph of light absorption intensity versus Raman signals excited by light with different wavelengths. Please refer to FIG. 5. FIG. 5 shows fluorescence absorbance results of excitation light beams with different wavelengths for the test specimens 20 with different colors but the same material. As shown in FIG. 5, it can be seen that when light with a wavelength of less than 785 nanometers is used as the excitation light beam, the fluorescence absorbance results of the test specimens 20 with different colors but the same material are easily interfered. When light with a wavelength of greater than 785 nanometers is used as the excitation light beam, the fluorescence absorbance results of the test specimens 20 with different colors but the same material are more consistent. Therefore, in an embodiment, selecting 1064 nanometers as the wavelength of the excitation light beam L1 has a good effect, which can prevent the excited Raman signal from being interfered by color.

Figure 6:
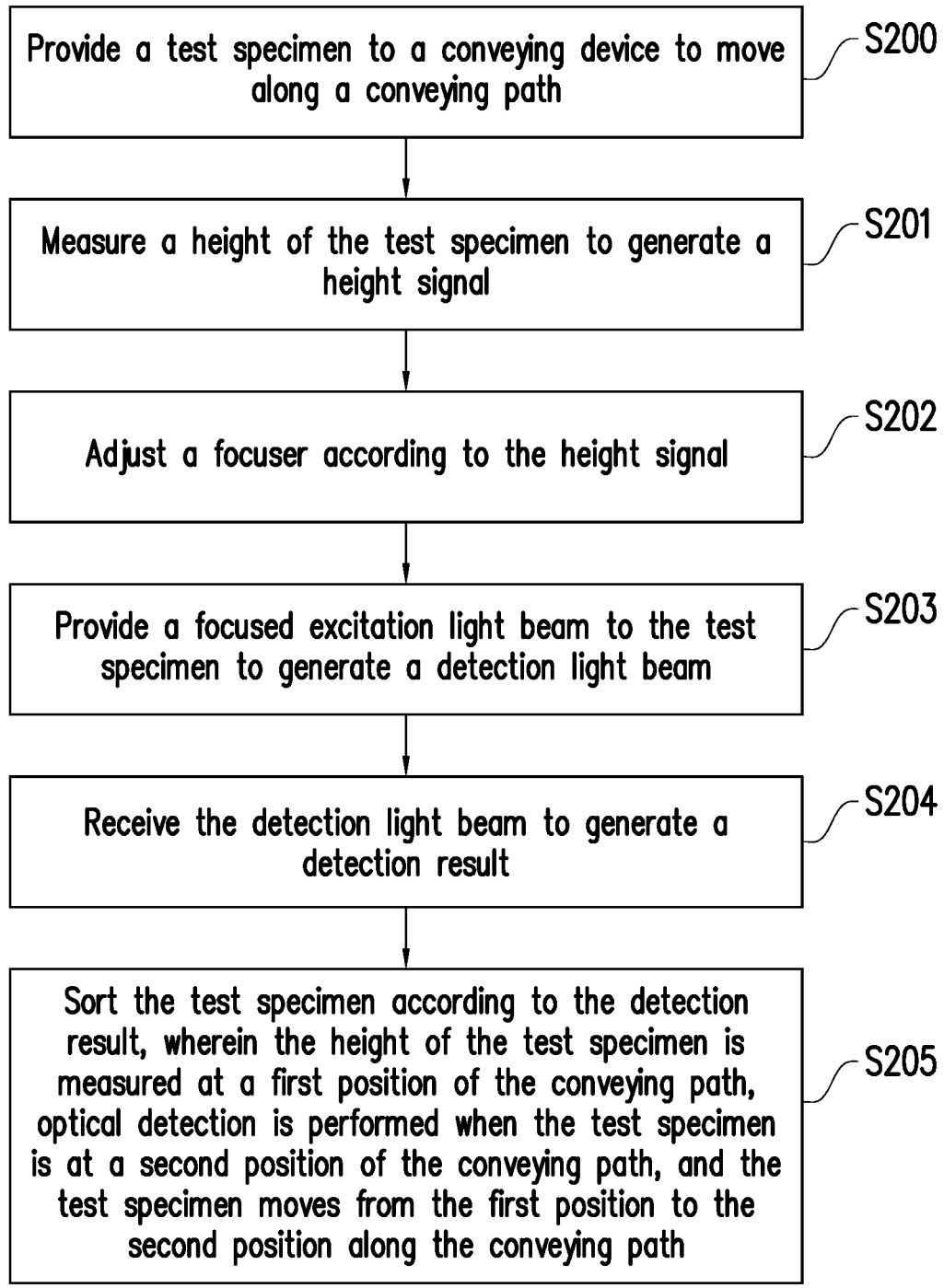
FIG. 6 is a flowchart of steps of a using method of a textile sorting system according to an embodiment of the disclosure.

FIG. 6 is a flowchart of steps of a using method of a textile sorting system according to an embodiment of the disclosure. Please refer to FIG. 1 to FIG. 4 and FIG. 6. The using method of the textile sorting system of the embodiment may be applied to the textile sorting system 50 shown in FIG. 1, so the following description takes the textile sorting system 50 shown in FIG. 1 as an example. In the embodiment, firstly, Step S200 is executed to provide the test specimen 20 to the conveying device 60 to move along the conveying path A. Next, Step S201 is executed to measure the height of the test specimen 20 to generate the height signal S1. Specifically, the height sensor 110 is used to measure the height of the test specimen 20 to generate the height signal S1, and the height signal S1 is provided to the focuser 140.

Then, Step S202 is executed to adjust the focuser 140 according to the height signal S1. A method for adjusting the focuser 140 according to the height signal S1 further includes: receiving the height signal S1; and moving the carrier 144 along the adjustment path B according to the height signal S1. Specifically, the control element 146 in the focuser 140 is used to receive the height signal S1, and the control element 146 is used to control the driving element 148, thereby driving the adjustment of the position of the carrier 144, so that the excitation light beam L1 achieves a good focus effect by the focus lens 142.

Then, Step S203 is executed to provide the focused excitation light beam L2 to the test specimen 20 to generate the detection light beam L3. A method for providing the focused excitation light beam L2 to the test specimen 20 to generate the detection light beam L3 further includes: providing the excitation light beam L1; receiving the excitation light beam L1 to be converted into the focused excitation light beam L2; and providing the focused excitation light beam L2 to the test specimen 20 to generate the detection light beam L3. Specifically, the excitation light source 120 is used to provide the excitation light beam L1 to the Raman optical instrument 132, the Raman optical instrument 132 is then used to emit and transmit the excitation light beam L1 to the focuser 140, and the focused excitation light beam L2 is formed through the focus lens 142. The focused excitation light beam L2 is transmitted from the focus lens 142 to the test specimen 20 to generate the detection light beam L3 with the Raman signal.

Then, Step S204 is executed to receive the detection light beam L3 to generate the detection result. Specifically, the Raman optical instrument 132 is used to receive the detection light beam L3 transmitted back along the original path, the detection light beam L3 is transmitted to the infrared spectrometer 134 for detection, and the detection result of the infrared spectrometer 134 is finally used to obtain material information of the test specimen 20.

Finally, Step S205 is executed to sort the test specimen 20 according to the detection result. Specifically, the sorting module 70 is used to sort the test specimen 20 to a correct storage place according to the detection result. In other words, during the optical detection process, the conveying device 60 may continuously and uninterruptedly transport the test specimen 20. In this way, the efficiency and accuracy of optical detection of the test specimen 20 can be greatly improved, thereby improving the sorting efficiency of the test specimen 20.

In summary, in the textile detection module, the textile sorting system and the using method thereof of the disclosure, the height sensor measures the height of the test specimen to generate the height signal. The focuser adjusts the position of the focus lens according to the height signal, so that the excitation light beam emitted by the optical detector along the optical axis can achieve a good focus effect, thereby improving the quality of the detection light beam. The optical detector receives the detection light beam to generate a good detection result. Therefore, the height sensor may measure the height of the test specimen at the first position of the conveying path, the optical detector may perform optical detection on the test specimen at the second position of the conveying path, and the test specimen moves from the first position to the second position along the conveying path. In this way, the conveying device may continuously and uninterruptedly transport the test specimen, which can improve the efficiency and accuracy of optical detection of the test specimen, thereby improving the sorting efficiency of the test specimen.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A textile detection module, suitable for detecting a test specimen, the textile detection module comprising:
a height sensor, suitable for measuring a height of the test specimen to generate a height signal;
an excitation light source, providing an excitation light beam;
an optical detector, disposed on a transmission path of the excitation light beam and suitable for receiving the excitation light beam and emitting the excitation light beam along an optical axis and receiving a detection light beam to generate a detection result; and
a focuser, disposed on the transmission path of the excitation light beam emitted by the optical detector, wherein the focuser comprises a focus lens suitable for converting the excitation light beam into a focused excitation light beam, and the focused excitation light beam is transmitted from the focuser to the test specimen to generate the detection light beam, wherein
the focuser adjusts a position of the focus lens according to the height signal, the height sensor measures the height of the test specimen at a first position of a conveying path, the optical detector performs optical detection on the test specimen at a second position of the conveying path, and the test specimen moves from the first position to the second position along the conveying path.

2. The textile detection module according to claim 1, wherein a ratio of a maximum height difference of the test specimen to a moving speed of the focus lens is less than a ratio of a maximum length difference of the test specimen to a moving speed of the test specimen.

3. The textile detection module according to claim 1, wherein the excitation light source is an infrared laser light emitting device.

4. The textile detection module according to claim 1, wherein a wavelength of the excitation light beam is greater than 900 nanometers.

5. The textile detection module according to claim 1, wherein the optical detector comprises a Raman optical instrument and an infrared spectrometer, the Raman optical instrument receives the excitation light beam and emits the excitation light beam to the focuser, and the infrared spectrometer receives the detection light beam to generate the detection result.

6. The textile detection module according to claim 5, wherein the Raman optical instrument comprises an optical guiding element suitable for receiving and transmitting the excitation light beam.

7. The textile detection module according to claim 1, wherein the focuser further comprises a carrier, a control element, and a driving element, the carrier carries the focus lens, the control element receives the height signal and generates an adjustment signal according to the height signal to provide the adjustment signal to the driving element, the driving element moves a position of the carrier along an adjustment path according to the adjustment signal, and an extension direction of the adjustment path is parallel to an extension direction of the optical axis.

8. A textile sorting system, suitable for sorting a test specimen, comprising:
a conveying device, suitable for moving the test specimen along a conveying path;
the textile detection module according to claim 1, wherein the textile detection module is disposed at the conveying device; and
at least one sorting module, disposed at the conveying device, wherein the optical detector is located between the height sensor and the at least one sorting module, and the at least one sorting module sorts the test specimen according to the detection result.

9. The textile sorting system according to claim 8, wherein the conveying device comprises a conveyor belt suitable for uninterruptedly and continuously conveying the test specimen along the conveying path.

10. The textile sorting system according to claim 9, wherein the at least one sorting module is an air blowing device, a mechanical arm, or a divider board.

11. A using method of a textile sorting system, comprising:
providing a test specimen to a conveying device to move along a conveying path;
measuring a height of the test specimen to generate a height signal;

adjusting a focuser according to the height signal;
providing a focused excitation light beam to the test specimen to generate a detection light beam;
receiving the detection light beam to generate a detection result; and
sorting the test specimen according to the detection result, wherein
the height of the test specimen is measured at a first position of the conveying path, optical detection is performed on the test specimen at a second position of the conveying path, and the test specimen moves from the first position to the second position along the conveying path.

12. The using method of the textile sorting system according to claim 11, wherein a method for adjusting the focuser according to the height signal further comprises:
receiving the height signal; and
moving a carrier along an adjustment path according to the height signal, wherein the carrier carries a focus lens.

13. The using method of the textile sorting system according to claim 11, wherein when the height of the test specimen is measured or optical detection is performed on the test specimen, movement of the test specimen is not stopped.

14. The using method of the textile sorting system according to claim 11, wherein a method for providing the focused excitation light beam to the test specimen to generate the detection light beam further comprises:
providing an excitation light beam;
receiving the excitation light beam to be converted into the focused excitation light beam; and
providing the focused excitation light beam to the test specimen to generate the detection light beam.

* * * * *